United States Patent

[11] 3,601,753

[72] Inventor Edward C. Uberbacher
Poughkeepsie, N.Y.
[21] Appl. No. 45,082
[22] Filed June 10, 1970
[45] Patented Aug. 24, 1971
[73] Assignee International Business Machines Corporation
Armonk, N.Y.

[54] COAXIAL INTERFACE CONNECTOR
9 Claims, 6 Drawing Figs.

[52] U.S. Cl. .......... 339/18 C, 174/68.5, 317/101, 339/17 LM, 339/143 R
[51] Int. Cl. .......... H01r 29/00
[50] Field of Search .......... 339/17 R, 17 C, 17 L, 17 LM, 17 M, 17 N, 17 T, 18 R, 18 B, 18 C, 143, 153–158, 252, 14; 174/68.5; 317/101

[56] References Cited

UNITED STATES PATENTS

| | | | |
|---|---|---|---|
| 2,929,965 | 3/1960 | Oden | 339/17 LM X |
| 2,879,458 | 3/1959 | Schubert | 339/18 C X |
| 2,482,998 | 9/1949 | Andersson | 339/18 C |

OTHER REFERENCES

IBM Technical Disclosure Bulletin, Vol. 6, No. 8, Jan. 1964, p. 87— " Circuit Board Connective Scheme," , by Roche & Palmateer.

*Primary Examiner*—Stephen J. Novosad
*Assistant Examiner*—Terrell P. Lewis
*Attorneys*—Hanifin and Jancin and Harold H. Sweeney, Jr.

ABSTRACT: Three electrically conductive sheets are provided which are bonded together to form an electrical coaxial interface connector. The middle or signal plane sheet is made of a spring material and has formed therein a plurality of paired contact members. The outer or ground plane sheets are coated with a dielectric material. These outer sheets have openings therein which are indexed with the underlying contact element of the paired contact members. Once the three conductive sheets are bonded together, the interconnecting pads between the paired contact members are removed to provide electrical isolation. A tool is provided which consists of pins and opposed die surfaces which, when positioned with respect to the connector, provides a means by which the contact elements are bent so that they extend through the openings indexed therewith in the outer conductive sheets.

INVENTOR
EDWARD C. UBERBACHER

BY Harold H. Sweeney Jr.
ATTORNEY

COAXIAL INTERFACE CONNECTOR

This invention relates to connectors and more particularly to coaxial connectors serving as an interface between surfaces such as circuit boards.

As electronic circuitry and components have been miniaturized, the connector art has had to develop smaller connectors operable in high density packages for making connections to the circuitry or making interconnections between circuits on different modules or boards. A number of different approaches have been taken to making such interconnections. Many variations of the male pin and the female receptacle type of interconnection have been developed. These approaches require the drilling of a number of holes in the circuit boards to be interconnected in which the pins and the receptacles are mounted. Often times, there is insufficient room due to the compact circuitry and component layout on the boards. Also, the operation of drilling small holes on close tolerances is expensive and relatively difficult to accomplish. In this regard, it is also necessary to solder the pins and receptacles in place and to the proper circuit on the respective boards. It will be appreciated that soldering in a closely packed circuit environment is difficult to accomplish automatically and introduces problems with respect to reliability.

Today's circuit technology provides for very high-speed operation. This is due, in some measure, to the small distances that the electric signals have to travel in proceeding from one circuit to another, etc. Thus, the optimum high density connector design would provide the shortest electrical lengths. This would place the circuit boards extremely close together thus, introducing possible crosstalk or signal interference. Likewise, the closely packed interconnectors themselves are subject to crosstalk or signal interference. Along with the high density or the large number of interconnections that have to be made in a very small space, the cost becomes a problem.

Therefore, it is an object of the present invention to provide an interconnector in which the paired contact members are shielded.

It is another object of the present invention to provide a coaxial interconnector which can be manufactured using automation techniques, thereby reducing the cost per contact element considerably.

It is a further object of the present invention to provide a coaxial interconnector which has an extremely short electrical length so that it is compatible with high-speed applications.

It is a further object of the present invention to provide a coaxial interconnector which does not require any soldered connections.

Briefly, the invention comprises an electrical connector for interconnecting circuits on adjacent circuit boards or the like consisting of three conductive sheets. The middle conductive sheet is made of a spring metal material and has paired contact members formed therein. The paired contact members are interconnected by pads or portions of the middle sheet. The outer sheets have a dielectric coating formed thereon and have holes or openings placed therein so that the outer sheets when bonded to respective sides of the middle sheet have the openings indexed with the contact elements of the paired contact members. The interconnecting pads are treated so as to resist any coating and the contact elements are precious metal coated. The interconnecting pads are removed by utilizing an etchant to etch the uncoated pads. The contact elements are then bent out through the openings indexed therewith in the outer conductive sheet. Thus, we have a relatively flat interconnector having contact elements extending slightly from both sides thereof to contact circuits on adjacent circuit boards.

The foregoing and other objects, features and advantages of the invention will be apparent from the following more particular description of a preferred embodiment of the invention as illustrated in the accompanying drawings.

Figure 1:
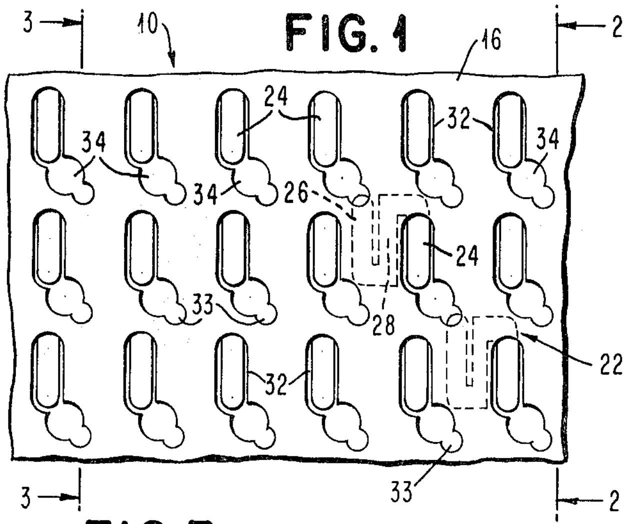
FIG. 1 is a plan view of one side of the interconnector showing the contact elements indexed with the openings in the ground signal sheet.
Figure 2:
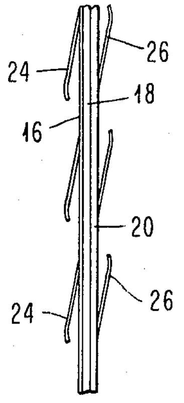
FIG. 2 is an edge view taken along the line 2—2 of FIG. 1 showing the contact elements extending from both sides of the interconnector.
Figures 3, 4:
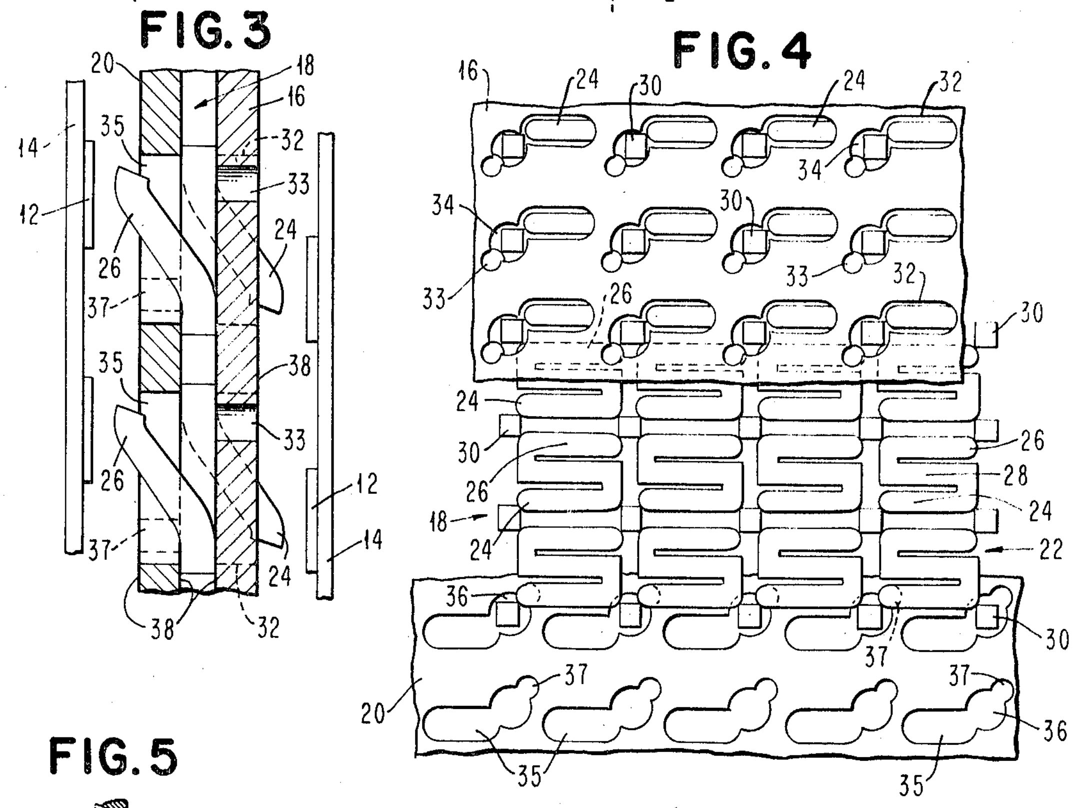
FIG. 3 is a partial blown-up view taken along the line 3—3 of FIG. 1 showing the contact elements, the openings in the ground planes through which the contact elements extend, and the surfaces to be connected via the contacts.
FIG. 4 is a cutaway view showing the signal plane sheet and the upper and lower ground signal sheets before the paired contact members are separated by removing the interconnecting pads.

Referring to FIG. 1, there is shown a view of one side of the interconnector member 10 for connecting between circuits on opposing surfaces such as circuit boards. The interconnector 10 is formed from three electrically conductive sheets of material 16,18 and 20 which are bonded together as shown in FIG. 4. The middle sheet 18 forms the signal plane and the outer two sheets 16,20 form the ground planes of the coaxial interconnector member 10. The middle sheet 18 is formed of a spring material such as phosphorous bronze or beryllium copper. This middle sheet 18 or signal plane has formed therein a plurality of paired contact members 22. Each paired contact member 22 consists of two contact elements 24,26 connected by a base portion 28. One contact element of each contact member 22 is arranged to contact the land 12 on an adjacent circuit board 14 while the other contact element is adapted to contact a land 12 on the opposing circuit board 14 as shown in FIG. 3. The electrical path between the contacts 24,26 is through the connecting base portion 28. These paired contact members 22 can be formed in the signal plane conductive sheet 18 by a milling process. Actually, the artwork must be performed on the sheet and the milling performed in accordance therewith. The preferred paired contact elements 22 have an S shape as can be seen best in FIG. 4. The S-shaped paired contact members 22 are connected together by the interconnecting pads 30 which are the portions of the sheet 18 left at each remote corner of the S-shaped members 22 after the milling process.

The S-shaped configuration was selected because it provides a maximum-size contact beam system. The 100-mil-square surface area available for this particular application must contact a minimum of two contacts 24,26, one upper and one lower, and a base portion 28. The base portion 28 is required to secure the individual contact member between the two ground planes 16,20 and to prevent any twisting movement of the contacts 24,26. Other configurations can be used to provide contact redundancy in connector designs that can employ larger contact spacing.

The ground plane sheets 16,20 have a plurality of openings 32,35 formed therein, respectively. These openings may be formed by a milling process. The holes or openings 32,35 are located such that they are indexed with a respective underlying contact element 24,26 of the paired contact members 22 when the sheets 16,18 and 20 are aligned and bonded together. The top sheet 16, as shown in FIG. 4, has the openings 32 therein indexed with the bottom contact 24 of each pair of contacts. Likewise, the underlying ground signal plane 20 has the openings 35 therein indexed with the top contact 26 of each contact pair. Each opening 32,35 has an elongated portion 34,36 extending diagonally from one end thereof, respectively. Looking at FIG. 4, it can be seen that the elongated openings 34 in the top sheet 16 extend downward and to the left while the underlying ground plane sheet 20 has the elongated opening portion 36 extending upward and to the right. These hole elongations 34,36 are long enough to uncover the interconnecting pads 30 at these corners of the S-shaped contact members 22 as well as the end of the contact elements 24,26 of the paired contact member 22 which is diagonally located with respect thereto in the adjacent row. It will be shown later in the description that the uncovered portion of a contact element 24,26 of a diagonally positioned paired contact member 22 is utilized in connection with the bending of the contact elements 24,26 out of the signal plane through the opening 32,35 indexed therewith in the respective ground plane sheets 16,20. Before the sheets 16,18,20 are bonded together, the connecting pads 30 of the middle sheet 18 are treated so that they will resist any precious metal plating such as gold plating. The sheet 18 is then plated with a precious metal such as gold. This provides a good contact surface on the contact elements 24,26. Both of the ground plane sheets 16,20 are coated with a good dielectric material 38. This dielectric material 38 can be applied by an electrophoretic process which applies a hole free, even thickness coating of insulation over the entire ground plane sheet. It has been found that a polymer dielectric material is preferred. The impedance characteristic of the interconnector is determined by the thickness of the dielectric coating 38, as is the case in coaxial conductors. After the signal sheet 18 and the ground plane sheets 16,20 are aligned, the three layers 16,18,20 are pressure bonded together in a heated-platen press. The thermoplastic polymer coating 38 can be used to provide the necessary adhesion to hold the layers together. The laminated or completed assembly 10 is now exposed to an etchant bath which etches away the connecting pads 30 which are exposed through the openings 34,36 in the ground plane sheets 16,20. Once these pads are removed, the contact members 22 are physically and electrically isolated from one another. It will be appreciated, that selected connecting pads 30 can be left intact so that they serve as a circuit interconnecting means between selected paired contact members 22.

The openings 32,35 provided in the ground sheets 16,20 permit the leaf springs or contact elements 24,26 of the paired contact members 22 to protrude therethrough, respectively. The distance that the contact elements 24,26 extend beyond the outer surface of the ground plane sheets 16,20 determines the maximum contact element 24,26 deflection. A fully deflected contact element 24,26 is positioned within the respective ground sheet opening 32,35. The contact elements 24,26 in the design described herein extend 1.5 mils beyond the outer surface of the covering ground sheet 16,20. This distance provides a contact force of approximately 30 grams for each leaf spring 24,26. Typical connector latching hardware (not shown) is obviously required to maintain the interconnector 10 and boards 14 in position. There are various combinations of contact pressures, contact surface radii and Hertz stresses which are usable. The assumed optimum stress of 150,000 p.s.i. is obtainable with a contact force of 30 grams and a spherical contacting radius of 0.014 inches.

Figure 5:
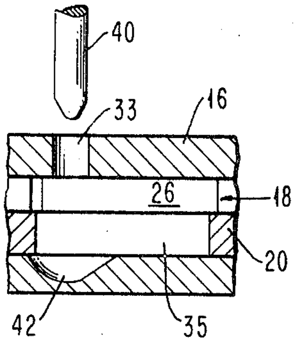
FIG. 5 is a blown-up view showing the tool in position before the operation to bend the contact element through the opening indexed therewith.
Figure 6:
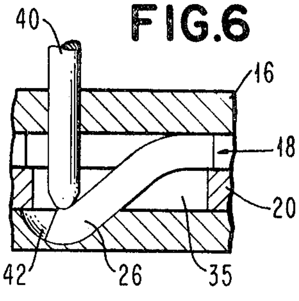
FIG. 6 is a blown-up view showing the tool after the bending of the contact elements into operational position.

The contact elements 24,26 bending operation is performed after the ground planes 16,20 and signal plane sheet 18 are bonded together and the contacts 24,26 are isolated. A tool consisting of multiple pins 40 and mating cavities is used. The lower half of the tool consists of a dye cavity 42 and the upper half of the tool consists of a plurality of pins 40. The pins 40 are located above one of the ground plane sheets 16,20 so as to be indexed with the respective end opening 33,37 thereof as shown in FIG. 5. These end openings 33,37 form the ends of the elongated portion 34,36 of the openings 32,35. As previously mentioned, these end openings 33,37 uncover a portion of the back of the respective contact element 24,26 of the contact member 22 which is located diagonally therewith and in the adjacent row. The dye cavity 42 is placed below the ground plane sheet 16,20 on the opposite side of the connector and has the cavities 42 indexed with the openings 32,35 therein. In operation, the upper half of the tool is moved toward the connector 10 so that the pins 40 pass through the respective end opening 33,37 and press on the uncovered back portion of the respective contact elements 24,26. These contact elements 24,26 are forced by the pins 40 to bend through the respective underlying openings 32,35 in the ground plane sheets 16,20 into the shaping cavities 42 of the die as shown in FIG. 6. The connector 10 is turned over and the contact element 24,26 bending operation given above is repeated for the other contact elements 24,26 of each paired contact member 22 which are to protrude from the other ground plane sheet 16,20. Thus, we have one contact of each paired contact member 22 extending from one side of the connector 10 and the other contact extending from the other side of the connector 10. It will be appreciated that these contact elements 24,26 can be placed between surfaces 14 to be interconnected so that each contact element 24,26 of a contact member 22 presses on an adjacent circuit land 12 on the adjacent face thereby affording an electrical interconnection from surface to surface through the respective paired contact members 22.

The extent of the protrusion of the contact elements 24,26 from the outer surface of the ground layers 16,20 is determined to some extent by the tolerances to which the circuit boards 14 being interconnected are held to. If there is a slight curvature to the boards 14, it will be appreciated that the interconnecting assembly 10 is capable of making good connections therebetween.

Selected contact elements 24,26 are terminated to the outer ground plane sheets 16,20 to provide an optimum ground signal path through the connector. The number of contacts 24,26 used to transfer the ground signal can range from one for every signal contact to one for every connector assembly 10. The permissible signal degradation usually determines the quantity required. A spot-welding process is used to terminate the ground contacts to the ground planes 16,20 when the connector 10 is in its assembled stage.

It will be appreciated that the interconnector 10 described requires a clean environment for operation, since wipe between contacts 24,26 and lands 12 is virtually nonexistent. This connector assembly 10 is also operable in a dielectric fluid environment.

While the invention has been particularly shown and described with reference to a preferred embodiment thereof, it will be understood by those skilled in the art that various changes in form and detail may be made therein without departing from the spirit and scope of the invention.

What is claimed is:

1. An electrical interconnecting means between circuits on circuit boards or the like, comprising:

a first, second and third electrically conductive sheet, the second sheet being made of a spring metal forming the inner laminae signal sheet bonded between the first and third sheets, the first and third sheets being coated with a dielectric material and forming the ground signal sheets;

paired electrical contact members formed in said middle sheet;

a precious metal coating formed at least on said contact elements of said paired contact members;

said ground sheets having openings indexed with one of the contact elements in each pair of contact members;

means for selectively disconnecting the paired contact members from the other paired contact members on the sheet; and means for bending the contact elements so that they extend thru the openings indexed therewith so that interconnection between circuits on adjacent circuit boards can be made.

2. An electrical interconnecting means according to claim 1, wherein said paired electrical contact members are S-shaped the upper and lower hook of the S forming said pair of contact elements and the middle portion of the S forming a base about which the pair of contact elements bend.

3. An electrical interconnecting means according to claim 2, wherein said paired electrical contact members formed in said signal sheet are held together by interconnecting pads at the remote corners of the S-shaped pairs of electrical contact members.

4. An electrical interconnecting means according to claim 3, wherein said first and second electrically conductive ground plane sheets each have pad openings indexed with the interconnecting pads.

5. An electrical interconnector according to claim 4, wherein said pad openings are extensions of the openings in the ground plane sheets indexed with the contact elements of the paired electrical contact members.

6. An electrical interconnecting means according to claim 5, wherein said means for selectively disconnecting the paired contact members from the other paired contact members in the sheet comprises removing selected interconnecting pads through the pad openings in the ground signal sheets by etching.

7. An electrical interconnecting means according to claim 6, wherein further openings are provided in each ground signal sheet each uncovering a portion of the back of a contact element of an S-shaped paired contact member which is indexed with one of said openings in the opposite ground signal sheet so that said contact element can be bent to extend through said opening indexed therewith by pushing through said further opening.

8. An electrical interconnecting means according to claim 7, wherein said further openings are each a further extension of said opening indexed with a contact element and uncovering the back of a portion of a contact element of a paired electrical contact member which is located diagonally upward away from the free end of a top contact and diagonally downward away from the free end of a bottom contact of an S-shaped contact member.

9. An electrical interconnecting means according to Claim 8, wherein said means for bending the contact elements so that they extend thru the openings indexed therewith comprises a tool having die cavities placed adjacent to said openings thru which said contact elements are to extend, and a plurality of pins arranged on the other side of said interconnector indexed with said further openings and applying a pushing force to the underlying portion of the back of a contact element to cause it to bend through said opening indexed therewith and into said die cavity.